June 28, 1949. W. J. COX 2,474,515
TIRE TOOL
Filed Nov. 26, 1946
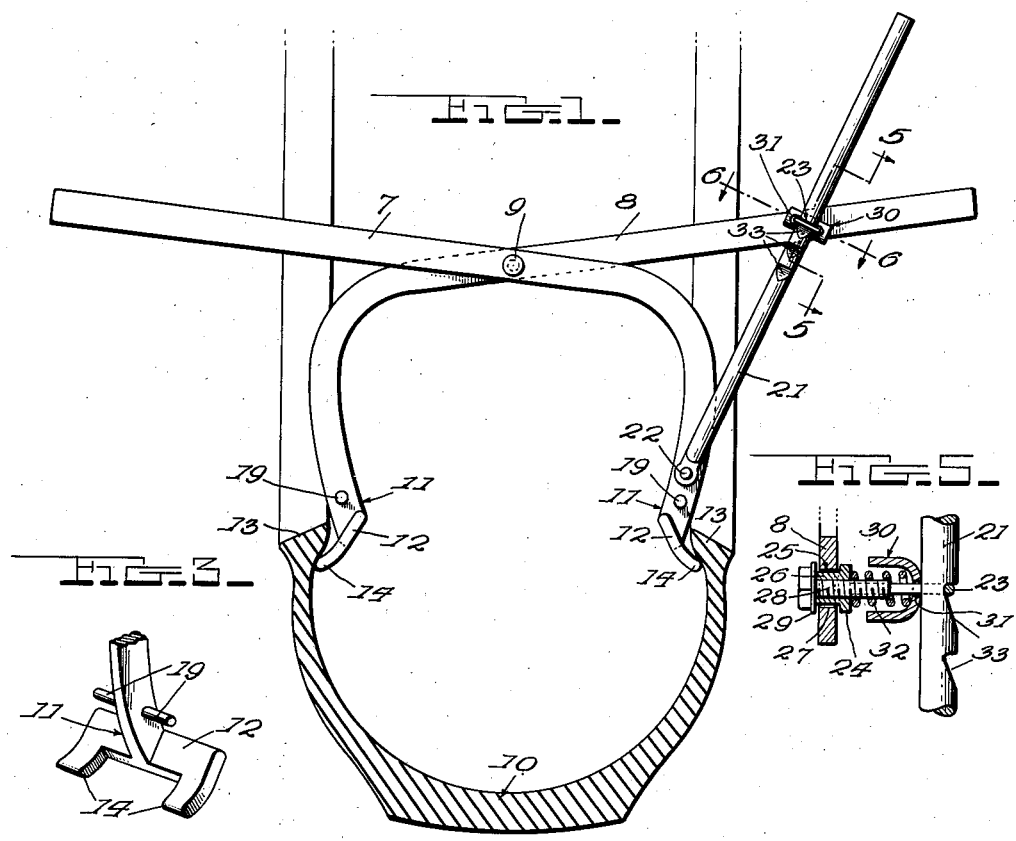
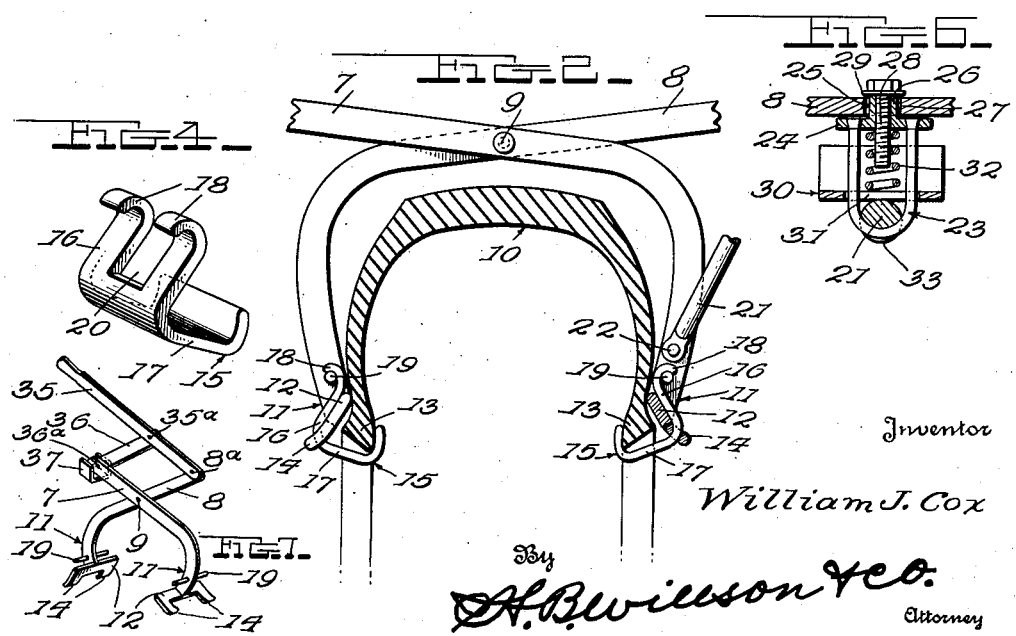
Inventor
William J. Cox
By H. B. Willson & Co.
Attorney Patented June 28, 1949

2,474,515

UNITED STATES PATENT OFFICE 2,474,515

TIRE TOOL

William Jared Cox, Woodruff, Utah

Application November 26, 1946, Serial No. 712,321

3 Claims. (Cl. 254—50.1)

The invention aims to provide a simple, inexpensive and effective tool designed primarily for spreading the beads of a tire casing to either aid in inserting the inner tube, or to facilitate inspection for casing injuries.

In carrying out the above end, a further object is to provide a bead-spreading tool constructed for operation within the circumference of the casing, but readily convertible to inwardly straddle the casing, if desired.

A still further object is to provide a construction which may be used also to force the tire beads toward each other to facilitate removal of a tire from a rim.

Yet another object is to make novel provision for holding the tool in bead-separating position.

Figure 1 is a transverse section through a casing and a side elevation of the tool showing the manner of using the latter within the circumference of the casing to spread the beads.

Fig. 2 is a view similar to Fig. 1 but illustrating the tool converted to inwardly straddle the casing to perform the bead-separating operation.

Fig. 3 is a fragmentary perspective view illustrating the bead-engaging end of one of the levers of the tool.

Fig. 4 is a detail perspective view of one of the auxiliary hooks which are engageable with the bead-engaging ends of the levers when the tool is to be used as seen in Fig. 2.

Figs. 5 and 6 are detail sectional views on lines 5—5 and 6—6 respectively of Fig. 1.

Fig. 7 is a perspective view showing a somewhat different form of construction.

In the drawings above briefly described, the numerals 7 and 8 denote two crossed levers pivoted together at 9 for movement in a plane transverse to a tire casing 10, the front end portions 11 of said levers being directed laterally so that each lever is substantially J-shaped, permitting the tool to be used either within the circumference of the casing 10, as shown in Fig. 1, or astride the casing as illustrated in Fig. 2. It will be noted that the pivotal connection of the levers is adjacent the juncture of the opposed curved inner ends with the straight outer ends of the levers.

The front extremities of the end portions 11 are provided with two flat, rectangular integral heads 12 respectively, said heads being elongated to extend circumferentially with respect to the casing beads 13 and projecting laterally in opposite directions with respect to said end portions 11 and their plane of operation. Each head 12 is disposed in a plane substantially radial with respect to the pivot 9 and the two heads will, therefore, lie substantially flat against each other when the tool is closed, and the outer longitudinal edge of each head 12 is provided at its ends with two outwardly curved claws 14. When the tool is in a closed position and the two pairs of claws are inserted between the beads 13, the tool may then be operated to readily spread the beads 13 as seen in Fig. 1. Also, when the tool is placed astride a tire casing and is then closed, the heads 12 and claws 14 will serve effectively to move the casing beads toward each other to permit easier removal of a tire from a wheel.

In order that the tool may be used astride a casing instead of within the circumference thereof, if desired, when the beads are to be separated, I provide the bead-engaging hooks 15 shown in Figs. 2 and 4. These hooks 15 are formed by bending flat metal plates and have angular shanks, the two end portions of which are denoted at 16 and 17 respectively. The shank portions 16 of the two hooks 15 lie against the outer sides of the heads 12, and the portions 17 extend between the claws 14, and the upper ends of said portions 16 have integral attaching hooks 18 detachably engageable with studs 19 which project in opposite directions from the lever ends 11, in spaced relation with the inner edges of the heads 12. The portions 16 of the two hooks 15 are formed with notches 20 to straddle the lever ends 11. The auxiliary hooks may be readily detached by simply swinging them outwardly and disengaging their attaching hooks 18 from the studs 19, whereupon the tool is readily useable either to force the beads of a tire casing toward each other, to facilitate tire removal, or to spread the beads when the tool is used as in Fig. 1. Should it be desired to use the tool in the manner shown in Fig. 2, the auxiliary hooks are readily connectible with the lever ends 11, to permit such use.

Novel provision is made for holding the two levers 7 and 8 against accidental return when the tool has been operated to spread the beads. This means includes a rod 21 having one of its ends pivoted at 22 to one of the lever ends 11, said rod extending across the rear end portion of the other lever. In the present disclosure, the rod is pivoted to the end 11 of the lever 7 and extends across the rear end portion of the lever 8. An elongated U-shaped yoke 23 is provided, through one end of which the rod 21 extends. The other end of this yoke is suitably secured to a yoke-mounting plate 24 which is pivotally mounted at 25 on the lever 8. In the present showing, the mounting means 25 includes a boss 26 on the plate 24, said boss extending through an opening 27 in the lever 8, and a screw 28 threaded longitudinally through said boss, a washer 29 being interposed between the free end of the boss and the screw head.

A channel-shaped shoe 30 is formed with a longitudinal slot 31 through which the yoke 23 extends, said shoe contacting with the side of the rod 21 toward the yoke-mounting plate 24. Interposed between this plate and the shoe 30 is a coiled compression spring 32. The free end of the screw 28 projects beyond the plate 24, within the spring 32, and holds the latter in place.

The side of the rod 21 disposed away from the lever 8 is formed with transverse grooves 33, any of which may receive the outer end of the yoke 23, and it will be seen that the spring 32 will exert a yieldable pressure against said rod to hold any groove properly engaged with said yoke end, and the grooves 33 are preferably of such shape that they will not interfere with sliding of the rod 21 through the yoke 23 as the two levers 7 and 8 are relatively moved to spread the beads of a casing, the grooves and yoke, however, preventing return movement of parts until rod 21 is pressed toward lever 8 to disengage the yoke 23 from the groove previously holding it.

In Fig. 7, a hand lever 35 is pivoted at 8a to the outer end of the lever 8 and is disposed substantially parallel with the rear end portion of the lever 7. A link 36 is pivoted at 36a to the rear extremity of this lever 8 and is pivoted at 35a to the lever 35, said link 36 being substantially parallel with the rear end portion of the lever 9. The lever 35 may be operated to move the heads 12 inwardly and outwardly with respect to each other and when said lever has been operated to outwardly move said heads to the maximum, it drops slightly below dead-center and is then received in a U-shaped clip 37, one end of which is mounted on the pivot 36a.

From the foregoing, taken in connection with the accompanying drawing, it will be seen that novel and advantageous provision has been made for carrying out the objects of the invention, and while preferences have been disclosed, variations may of course be made within the scope of the invention as claimed.

I claim:

1. A tire casing spreader comprising two J-shaped levers having their curved inner ends in opposed relation to straddle the exterior of a tire casing and their straight rear ends crossed and pivotally connected, two flat rectangular heads rigidly joined at their centers to the free extremities of the curved inner ends of said levers respectively, said flat heads being disposed in planes substantially radial with respect to the pivotal connection of said levers, spaced outwardly curved claws rigidly joined to the outer longitudinal edges of each of said heads, a pair of laterally projecting studs on the curved inner ends of each of said levers adjacent the outer sides of said heads, two detachable casing-bead hooks for said levers respectively, each of said hooks comprising a flat metal plate bent to form two shank portions and of a width to enter the space between the claws on said heads, one shank portion carrying the hook to engage the inner side of a casing bead and the other shank portion to lie against the outer side of one of said heads, said other shank portion being notched to straddle one of said levers and having curved hooks to engage a pair of said studs, and means for securing said levers in an adjusted position.

2. In a tire tool having two relatively movable levers; holding means for said levers comprising a rod pivoted to one of said levers and extending across the other of said levers, an elongated yoke through one end of which said rod extends, a yoke-mounting member secured to the other end of said yoke, pivot means pivoting said yoke-mounting member to said other lever on an axis at a right angle to said rod, said rod having a transverse groove to receive said one end of said yoke, a shoe slidably engaged with said yoke for movement longitudinally thereof, said shoe contacting with the side of said rod toward said yoke-mounting member, and a spring interposed between said yoke-mounting member and said shoe for exerting an outward force to yieldably hold said groove of said rod engaged with said one end of said yoke, said spring being yieldable to permit such movement of said rod as to disengage said groove thereof from said one end of said yoke when it is required that said rod slide through said yoke to permit relative movement of said levers.

3. A structure as specified in claim 2; said pivot means including a screw having a portion projecting from said yoke-mounting member toward said rod, said spring surrounding and being held in place by said portion of said screw.

WILLIAM JARED COX.

REFERENCES CITED

The following references are of record in the file of this patent:

UNITED STATES PATENTS

| Number | Name | Date |
| --- | --- | --- |
| 1,388,909 | Woodworth | Aug. 30, 1921 |
| 1,759,052 | Hopkins | May 20, 1930 |
| 1,815,764 | Edelmann | July 21, 1931 |
| 1,869,244 | Gabler | July 26, 1932 |
| 1,902,283 | Jackson et al. | Mar. 21, 1933 |
| 2,042,312 | Huebner | May 26, 1936 |